No. 636,377. Patented Nov. 7, 1899.
G. H. CLARK.
PNEUMATIC WHEEL TIRE.
(Application filed Mar. 7, 1898.)
(No Model.)
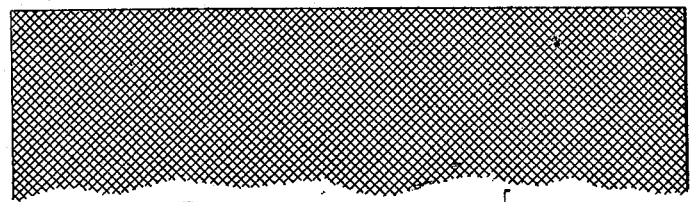
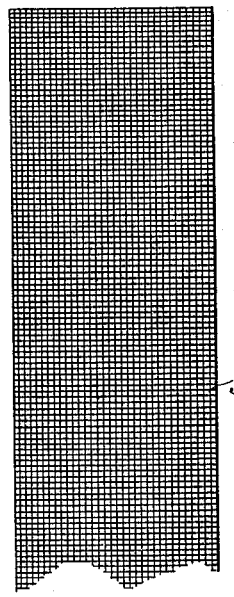
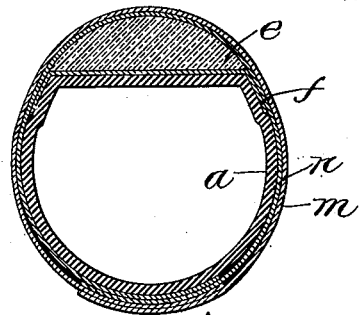
Fig. 5.
Fig. 1.
Fig. 4.
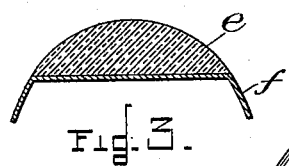
Fig. 3.
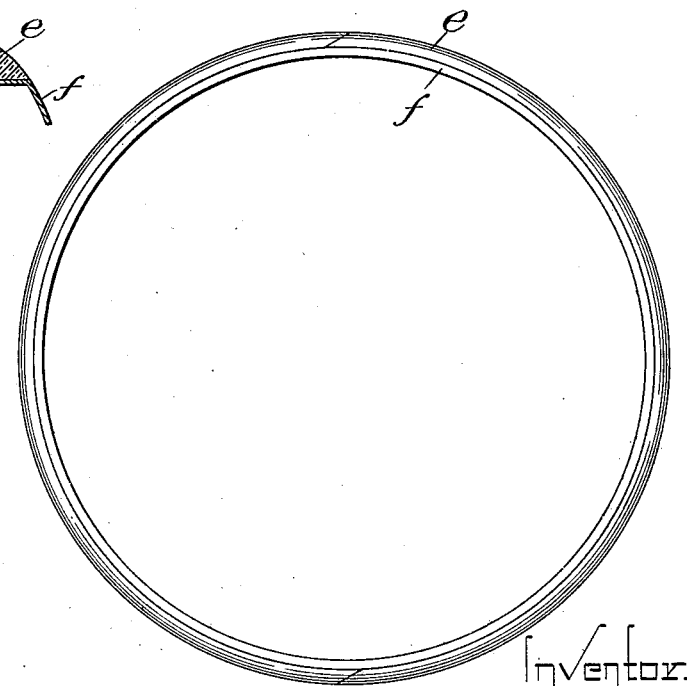
Fig. 2.
Witnesses:
Arthur F. Randall
Jennie L. Hutchinson
Inventor:
George H. Clark
by B. J. Hayes
Atty.
THE NORRIS PETERS CO., PHOTO-LITHO., WASHINGTON, D. C.

UNITED STATES PATENT OFFICE.

GEORGE H. CLARK, OF BOSTON, MASSACHUSETTS.

PNEUMATIC WHEEL-TIRE.

SPECIFICATION forming part of Letters Patent No. 636,377, dated November 7, 1899.

Application filed March 7, 1898. Serial No. 672,822. (No model.)

*To all whom it may concern:*

Be it known that I, GEORGE H. CLARK, of Boston, county of Suffolk, State of Massachusetts, have invented an Improvement in Pneumatic Wheel-Tires, of which the following description, in connection with the accompanying drawings, is a specification, like letters on the drawings representing like parts.

This invention has for its object to improve and simplify the construction of pneumatic wheel-tires and is intended as an improvement upon the tire shown in my application for patent, Serial No. 652,454. In the manufacture of the tire shown in said application one of the most difficult results to accomplish is to dispose the protecting-strip at the tread side of the tire evenly all around the tire, so that when the tire is inflated said strip will occupy the correct position designed for it; and my present invention is designed to enable this result to be better and more economically accomplished.

In accordance with this invention the protecting-strip is composed of a circular strip of cork or equivalent material of suitable shape in cross-section to be disposed at the tread side of the air-tube and a non-expansive strip of fabric, and said parts when secured together form a substantially non-extensible protecting-strip, and said protecting-strip is applied directly to the tread side of the air-tube—as, for instance, when the latter is on a mandrel. One and preferably both sides or faces of said non-expansive strip are coated with rubber to insure the parts adhering together when vulcanized. An expansive sheath, which may be composed of a strip of fabric cut off on the bias and coated on one and preferably both sides with rubber, is wrapped about said air-tube and protecting-strip thereon, thereby inclosing said parts within an expansive sheath, and, lastly, a wrapper will be applied outside of said expansive sheath, which may and preferably will also be made expansive—as, for instance, it may be constructed similarly to the aforesaid expansive sheath.

Figure 1 shows in cross-section a pneumatic wheel-tire embodying this invention; Fig. 2, a side view, on a small scale, of a substantially non-extensible protecting-strip which is disposed at the tread side of the air-tube; Fig. 3, a cross-section of said protecting-strip; Fig. 4, a detail of a portion of the non-expansive fabric which forms a coöperative part of said protecting-strip; Fig. 5, a detail of a portion of the expansive sheath.

$a$ represents the air-tube, which is made of rubber, and of a size slightly less in cross-section than it is desired it shall assume when inflated, and said tube may be formed upon a mandrel. A protecting-strip is provided at the tread side of said air-tube $a$, which is herein shown as composed of a circular strip $e$ of cork or equivalent flexible material and a narrow strip $f$ of non-expansive fabric. The strip $e$ of cork or equivalent material is circular and is made segmental, or substantially so, in cross-section, to adapt it to be used at the tread side of the tire. The strip $f$ is composed of a non-expansive strip of fabric, which is attached to the strip $e$, and said strip $f$ is made wider than said strip $e$, so that its edges will project therefrom in opposite ways. Said strip $f$ may be cut off the piece lengthwise, as represented in Fig. 4, instead of being cut off on the bias. The strip $e f$ thus produced serves as a protecting-strip for the tire and is flexible yet substantially non-extensible. The strip $f$ of fabric is preferably coated on both sides with rubber, and it is applied to the tread side of the air-tube $a$ while the latter is upon the mandrel and is cemented in place. $n$ represents a sheath which confines or incloses said air-tube $a$, with said protecting-strip $e f$ thereon, and the said sheath $n$ is made expansive, so that it will expand with the air-tube $a$ as the latter is inflated. Herein said sheath $n$ is made of fabric cut off on the bias, (see Fig. 5,) and said strip is preferably coated on both sides with rubber. Said expansive strip is wrapped around the air-tube and protecting-strip $e f$ thereon, and its opposite edges lap one over the other at the rim side of the tire. Another sheath $m$ is provided, which is wrapped around the aforesaid expansive sheath $n$, and, like said sheath $n$, it will be preferably made expansive, and therefore may be constructed in the same way. Said parts may be all secured together in the process of vulcanization, although one or both expansive sheaths $m$ and $n$ may be made and vulcanized independent, if desired.

It will be observed that the non-extensible protecting-strip prevents expansion of the tire at the tread side and that the overlapping portions of the sheath $m$ and $n$ prevent expansion of the tire at the rim side, and consequently the air-tube when inflated expands laterally. By providing the non-expansive strip $f$ and attaching it to the tread side of the air-tube means are thus provided for the attachment of the strip $e$, whereby said strip $e$ may be disposed evenly and with required precision all around the tire, and when the parts are vulcanized it will be found that said strip $e$ occupies a central position all around the tire. It will be understood that if said strip $e$ should swerve to one or the other side ever so little during the manufacturing process the tire would run irregularly and hence would be useless.

I claim—

In a pneumatic wheel-tire, an inflatable air-tube having secured to its tread side a non-extensible protecting-strip consisting of a circular strip $e$ of cork or equivalent material and a non-expansive strip of fabric $f$, secured to its under side, an expansive sheath $n$ inclosing said tube and protecting-strip thereon, and an outer covering, said parts being vulcanized together, substantially as described.

In testimony whereof I have signed my name to this specification in the presence of two subscribing witnesses.

GEO. H. CLARK.

Witnesses:
B. J. NOYES,
ARTHUR F. RANDALL.